United States Patent [19]
Chao

[11] Patent Number: 6,010,433
[45] Date of Patent: Jan. 4, 2000

[54] EXERCISER BIKE HAVING TWO DRIVING MECHANISMS

[76] Inventor: Chao-Yu Chao, No. 73, Tsao Chung Lane, Lu Kang Town, Chang-Hua Hsien, Taiwan

[21] Appl. No.: 09/012,416

[22] Filed: Jan. 23, 1998

[51] Int. Cl.[7] .............................. A63B 25/08; B62M 1/00
[52] U.S. Cl. ............................ 482/57; 280/233; 280/230
[58] Field of Search ................................. 482/57, 62, 51; 280/218–442, 236, 251, 282, 252, 230, 233

[56] References Cited

U.S. PATENT DOCUMENTS

| | | | |
|---|---|---|---|
| 4,639,007 | 1/1987 | Lawrence | 482/57 |
| 4,779,863 | 10/1988 | Yang | 482/57 |
| 5,163,886 | 11/1992 | Seol | 482/57 |

*Primary Examiner*—Stephen R. Crow
*Attorney, Agent, or Firm*—Charles E. Baxley, Esq.

[57] ABSTRACT

An exerciser bike includes a frame having a front wheel and a handle for steering the front wheel, and includes two rear wheel axles. Two rear wheels are rotatably secured to the rear wheel axles by two ratchet sprocket wheels. Two foot supports each has a middle portion pivotally coupled to the frame. Two chains are engaged on the ratchet sprocket wheels and each has one end secured to the frame and the other end secured to the foot support, for allowing the rear wheels and the ratchet sprocket wheels to be driven by the foot supports via the chains. The exerciser bike may be turned with the rear wheels when the rear wheels are actuated with different speeds.

2 Claims, 3 Drawing Sheets

EXERCISER BIKE HAVING TWO DRIVING MECHANISMS

BACKGROUND OF THE INVENTION

1. Field of the Invention

The present invention relates to an exerciser bike, and more particularly to an exerciser bike having two driving mechanisms for driving two rear wheels respectively.

2. Description of the Prior Art

Typical tricycles comprise a front wheel and two rear wheels. The two rear wheels are secured on a rear wheel axle and rotated in concert with the rear wheel axle. The tricycles comprise a single driving mechanism for driving the rear wheel axle such that the two rear wheels will be actuated by the single driving mechanism simultaneously and such that the tricycles may not be easily turned with the rear wheels.

The present invention has arisen to mitigate and/or obviate the afore-described disadvantages of the conventional tricycles.

SUMMARY OF THE INVENTION

The primary objective of the present invention is to provide an exerciser bike having two driving mechanisms for driving the rear wheels respectively and separately and for allowing the exerciser bike to be easily turned with the rear wheels.

In accordance with one aspect of the invention, there is provided an exerciser bike comprising a frame including a front portion having a front wheel and a handle for steering the front wheel, and including a rear portion having two rear wheel axles, two rear wheels rotatably secured to the rear wheel axles, and two driving means for driving the rear wheels separately. The exerciser bike is allowed to be turned with the rear wheels when the rear wheels are actuated with different speeds with the two driving means.

The two driving means each includes a ratchet sprocket wheel secured on the rear wheel axles, a foot support having a middle portion pivotally coupled to the frame at a pivot shaft and having a first end and a second end, a foot pedal secured on the first end of the foot support, and a chain engaged on the ratchet sprocket wheel and having a first end secured to the frame and a second end secured to the second end of the foot support, for allowing the rear wheels and the ratchet sprocket wheels to be driven by the foot supports via the chains. The two driving means each further includes a spring member having a first end secured to the frame and having a second end secured to the first end of the chain. The frame includes a beam, and two cushioning members disposed on the beam for engaging with the foot supports and for cushioning the foot supports.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
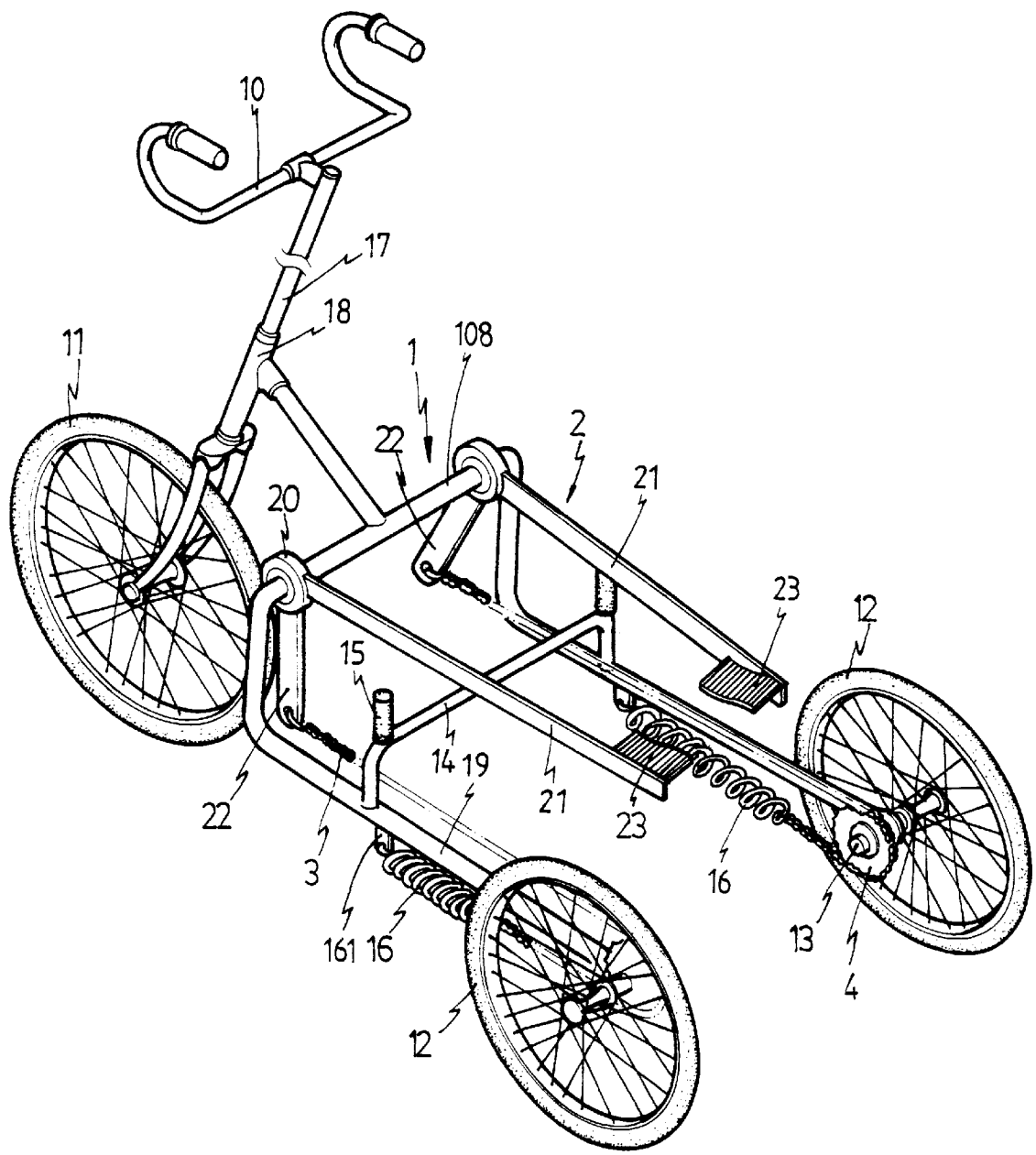
FIG. 1 is a perspective view of an exerciser bike in accordance with the present invention.
Figure 2:
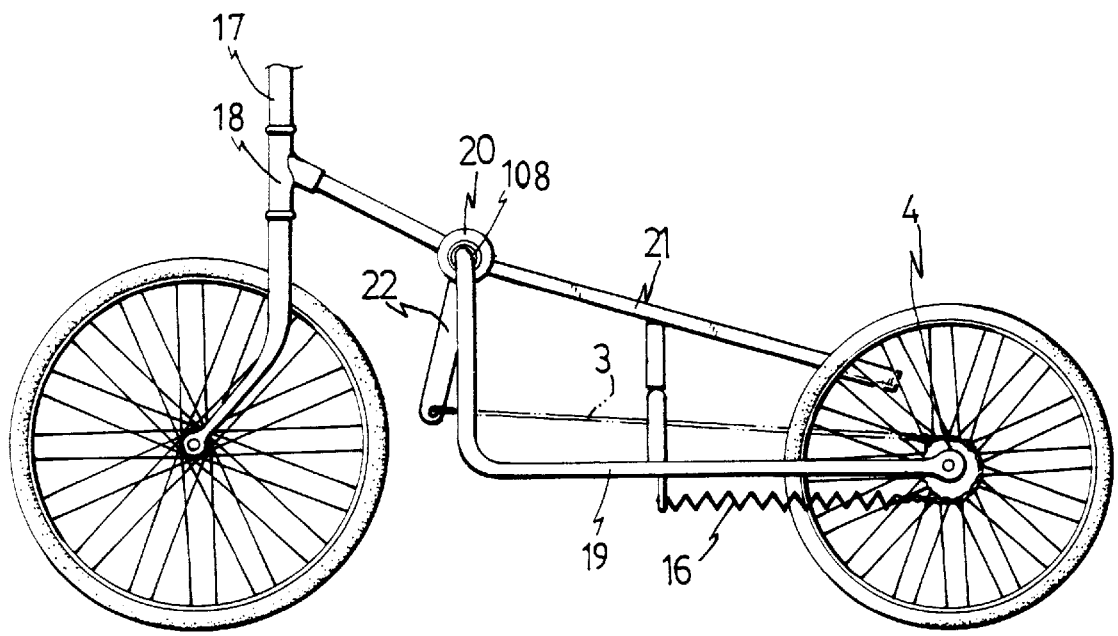
FIGS. 2 and 3 are side views illustrating the operation of the exerciser bike.

Referring to the drawings, and initially to FIGS. 1 and 2, an exerciser bike in accordance with the present invention comprises a frame 1 including a head tube 18 provided on the front portion and including a pair of rods 19 extended rearward. A spindle 17 is rotatably secured in the head tube 18. A front wheel 11 is secured to the lower portion of the spindle 17 and a handle 10 is secured on top of the spindle 17 for steering purposes. A pair of rear wheels 12 are rotatably secured to the rear ends of the rods 19 respectively at a rear wheel axle 13 by two ratchet sprocket wheels 4. The ratchet sprocket wheels 4 are typical and widely used nowadays. Two typical ratchet sprocket wheels are disclosed in U.S. Pat. No. 4,089,231 to Segawa, and U.S. Pat. No. 4,324,323 to Campagnolo, which may be taken as a reference for the typical ratchet sprocket wheels. Two chains 3 are engaged with the ratchet sprocket wheels respectively and each includes two ends. Two springs 16 each has one end secured to the rods 19 by an ear 161 and each has the other end secured to one end of the chains 3.

A pair of foot supports 2 include an L-shape and each has a middle portion rotatably secured to the frame 1 at a pivot shaft 108 by bearings 20. The foot supports 2 each includes a lever 21 having a foot pedal 23 secured thereon for supporting the feet of the user and each includes a bar 22 substantially perpendicular to the lever 21. The other ends of the chains 3 are secured to the lower ends of the bars 22 respectively. A beam 14 is secured in the middle portion of the frame 1 and two cushioning members 15, such as springs, soft pads etc., are disposed on the beam 14 for engaging with the levers 21 and for limiting the downward movement of the levers 21 and for biasing the levers 21 upward.

Figure 3:
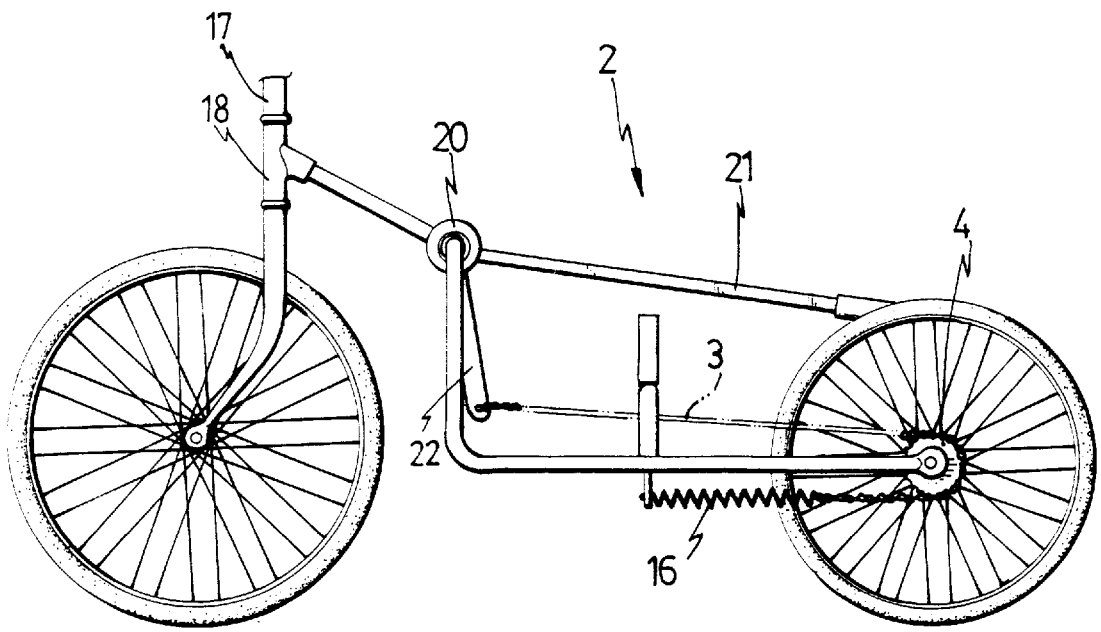

In operation, as shown in FIGS. 2 and 3, when the user steps on the foot pedals 23 and rotates the foot supports 2 about the pivot shaft 108, the chains 3 may be actuated in order to rotate the ratchet sprocket wheels 4 and the rear wheels 12 and in order to ride the exerciser bike.

It is to be noted that the two foot supports 2 are coupled to the rear wheels 12 respectively and are not coupled together with each other such that the rear wheels 12 may be driven separately by the two driving mechanisms 2, 21, 22, 3, 4. The two rear wheels 12 may be driven with different speeds such that the exerciser bike may be easilly turned. Alternatively, the chains 3 and the sprocket wheels 4 may be replaced by belts and pulleys.

Accordingly, the exerciser bike in accordance with the present invention includes two driving mechanisms for driving the rear wheels respectively and separately and for allowing the exerciser bike to be easily turned with the rear wheels.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An exerciser bike comprising:
   a frame including a front portion having a front wheel and a handle for steering said front wheel, and including a rear portion having two rear wheel axles,
   two rear wheels rotatably secured to said rear wheel axles, and
   two driving means for driving said rear wheels separately, said two driving means each including a ratchet sprocket wheel secured on said rear wheel axles, a foot support having a middle portion pivotally coupled to said frame at a pivot shaft and having a first end and a second end, a foot pedal secured on said first end of said foot support, and a chain engaged on said ratchet sprocket wheel and having a first end secured to said frame and a second end secured to said second end of said foot support, for allowing said rear wheels and said ratchet sprocket wheels to be driven by said foot supports via said chains, said exerciser bike being allowed to be turned with said rear wheels when said rear wheels are actuated with different speeds with said two driving means.

2. The exerciser bike according to claim 1, wherein said two driving means each includes a spring member having a first end secured to said frame and having a second end secured to said first end of said chain.

\* \* \* \* \*